(12) United States Patent
Harris et al.

(10) Patent No.: US 6,449,263 B2
(45) Date of Patent: *Sep. 10, 2002

(54) METHOD FOR COMMUNICATING SIGNALING MESSAGES THROUGH A BROADBAND NETWORK

(75) Inventors: Jeffrey Martin Harris; Ernest Earl Woodward, both of Chandler; Gerald James Hogg, Fountain Hills, all of AZ (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,974

(22) Filed: Mar. 2, 1998

(51) Int. Cl.[7] ................................................ H04B 7/185
(52) U.S. Cl. ..................................... 370/316; 370/395.2
(58) Field of Search ................................. 370/316, 323, 370/325, 360, 384, 400, 410, 422, 426, 395.2, 395.21

(56) References Cited

U.S. PATENT DOCUMENTS

| | | | | |
|---|---|---|---|---|
| 5,509,004 A | * | 4/1996 | Bishop, Jr. et al. | 370/325 |
| 5,523,997 A | * | 6/1996 | Bishop, Jr. | 455/428 |
| 5,659,542 A | * | 8/1997 | Bell et al. | 370/496 |
| 5,781,860 A | * | 7/1998 | Lopponen et al. | 455/426 |
| 5,828,952 A | * | 10/1998 | Sawyer | 455/427 |
| 5,953,350 A | * | 9/1999 | Higgins | 370/524 |
| 6,021,136 A | * | 2/2000 | Bharucha et al. | 370/477 |
| 6,047,161 A | * | 4/2000 | Sowles et al. | 455/12.1 |
| 6,069,890 A | * | 5/2000 | White et al. | 370/352 |
| 6,097,706 A | * | 8/2000 | Fielding et al. | 370/319 |
| 6,097,804 A | * | 8/2000 | Gilbert et al. | 379/230 |
| 6,112,085 A | * | 8/2000 | Garner et al. | 455/428 |

* cited by examiner

Primary Examiner—Kwang Bin Yao
(74) Attorney, Agent, or Firm—Ingrassia Fisher & Lorenz

(57) ABSTRACT

The present invention provides a method for communicating signaling messages associated with a communication system whereby a network within the communications system is responsible for setting up a signaling path between users of the communication system. However, once that signaling path is established by the network, the users may communicate with each other whereby the network is not needed to pass data between the users thereby substantially decreasing demand on the network and freeing it for other system functions.

7 Claims, 7 Drawing Sheets

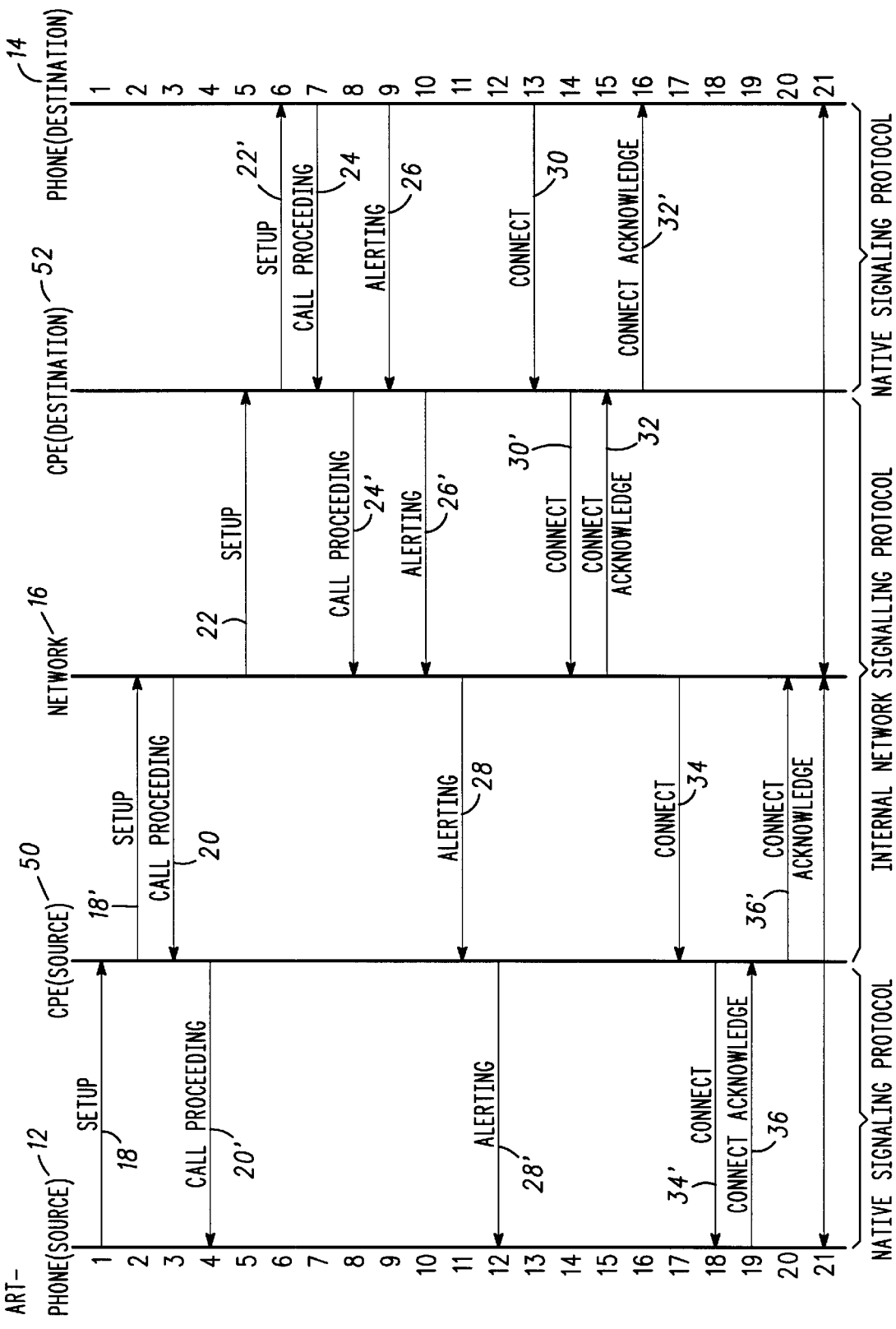

METHOD FOR COMMUNICATING SIGNALING MESSAGES THROUGH A BROADBAND NETWORK

FIELD OF THE INVENTION

This invention relates to communication systems and, in particular, to sending signaling messages through a communication network.

BACKGROUND OF THE INVENTION

Communication systems provide the medium by which one user at a first endpoint of the system may communicate to one or more other users of the system at one or more other endpoints. However, before users of a system can communicate with each other, the network of the system must first set up a data/signal path for the information to be transferred.

A first prior art approach setting up such signaling path is known as native signaling. Native signaling involves transferring the signals from each of the endpoints of the system via an intermediate switching network (or simply network). That is, the signals from each of the users must pass through the network before being transferred to its destination user. Essentially, the network interprets the signals and is responsible for establishing the connections between those two endpoints. However, a disadvantage of this approach is that the network must be responsible for passing many different signaling protocols based on the potentially many different signaling protocols of the users desiring to communicate. This places an undesirable burden on the network. Further, even after the connection is made, the data must still be processed by the network.

A second prior art approach to setting up such signaling path is known as emulation. Emulation allows many different protocols to be sent to the network. However, emulation requires the user's equipment to translate every one of its native protocol messages into an appropriate internal message for use by the network. Further, the network must then translate the internal message to a message that can be understood by the destination user's equipment. This technique places a substantial burden on the network because it requires a complex design of internal message signaling for the network since there must exist an analogous message, one from every different potential signaling protocol, or else certain signaling protocols will not be able to be processed by the network.

Hence, what is needed is a method for transferring data between users of a broadband communication system that does not substantially burden the system by virtue of the passage of data.

BRIEF DESCRIPTION OF THE DRAWINGS

FIG. 2 is a pictorial diagram illustrating the sequence of events associated with the setup and signaling path connections of the prior art emulation approach;

DETAILED DESCRIPTION OF THE DRAWINGS

The present invention provides a method for communicating signaling messages associated with a communication system whereby a network control entity (NCE), or simply network, within the communications system is responsible for setting up a signaling path between users of the communication system. However, once that signaling path is established by the network, the users may communicate with each other whereby the network is not needed to pass data between the users thereby substantially decreasing demand on the network and freeing it for other system functions.

In a preferred embodiment, user equipment associated with a source user initially sends a request through the system in order to begin a setup for communication with a destination user. This request is in the form of a standard signaling protocol that is understood by the network. The network then responds to contact the user equipment associated with the destination user and a call setup process is initiated. This call set up process includes defining a signaling path between the source's and destination's users equipment. Once the network sets up the connection and signal path between the source and destination users, the network is no longer needed and the burden on the network is substantially decreased because the source and destination users are able to effectively communicate over the signal path without load on the network. This is a substantial advantage over prior art methods that place a great burden on the network when data is being passed between users.

Figure 1:
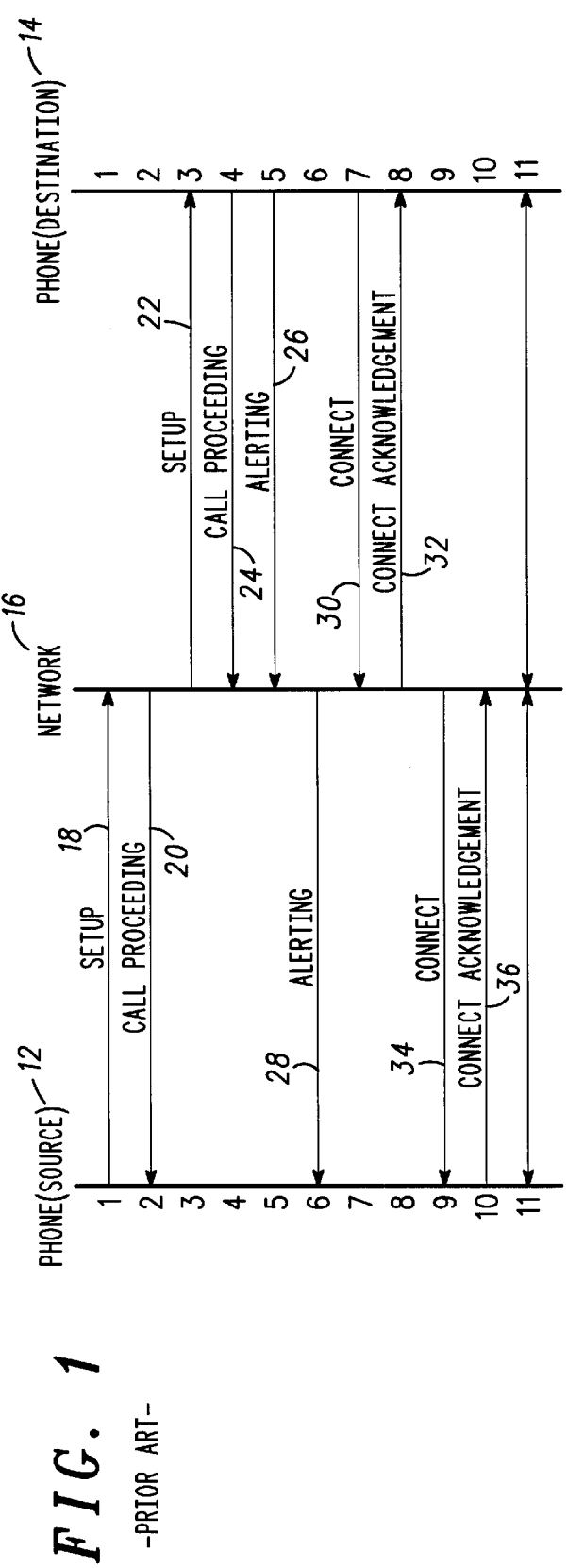
FIG. 1 is a pictorial diagram illustrating the sequence of events associated with the setup and signaling path connections of the prior art native signaling approach.

Referring to FIG. 1, a pictorial diagram illustrating the sequence of events for establishing call setup and signaling path connections associated with the prior art native signaling approach is shown. The native signaling may take the form of Q.931 signaling or Q.2931 signaling, for example. As discussed above, a signaling dialog occurs between the leafs 12 and 14 (shown in FIG. 1 as phones) and network 16 such that the two leafs can communicate with each other.

The first sequence of events is that leaf 12 (of which desires to initiate a call) sends setup message 18 to network switch 16. The network switch reflects back to leaf 12 that it received the setup message by sending call proceeding message 20.

The network switch then initiates a process to connect with the destination leaf 14. First, network 16 sends setup message 22 to leaf 14. Leaf 14 responds that it received the setup message and that it is doing what it needs to do to proceed with the call by reflecting back call proceeding signal 24.

Leaf 14 then begins ringing and appropriately sends back alerting message 26 to network 16. The network then reflects alerting message 28 back to leaf 12, such that leaf 12 may provide an audible ringing sound.

When leaf 14 is ready to establish the connection, it sends connect message 30 to network 16 thereby informing network 16 that a connection has been made. The network responds that it received the connect message by sending connect acknowledgment message 32 to leaf 14.

Finally, the network has to inform leaf 12 that the connection is up so the network sends connect message 34 to leaf 12 and leaf 12 responds with connect acknowledge message 36.

Now, a connection is made and data flows between leafs 12 and 14 but only through network 16. This technique, as discussed above, has the disadvantage of placing a substantial burden on the network when the leafs are communicating with each other since all data must be processed by the network. Further, the network must be able to handle all of the native signaling protocols from all of its leaf devices.

Referring now to FIG. 2, a pictorial diagram illustrating the sequence of events for establishing call setup and signaling path connections associated with the prior art emulation approach is shown. Elements shown in FIG. 2 that are identical to elements shown in FIG. 1 are identified by the same reference numbers. The concept behind the emulation technique is that since it is undesirable for the network to handle many different signaling protocols, the network only processes one internal message set. However, leafs 12 and 14 must be coupled to customer premises equipment (CPE) 50 and 52, respectively, whereby CPEs 50 and 52 are responsible for translating every one of the native protocol messages into an appropriate message for the internal network signaling protocol. That is, CPE 50 receives native signaling protocol signals associated with leaf 12 and converts that message into the appropriate message corresponding to internal network signaling protocol associated with network 16, and vice versa. Likewise, CPE 52 receives internal network signaling protocol messages from network 16 and translates these messages to message signals corresponding to native signaling protocol associated with leaf 14, and vice versa.

Referring back to FIG. 2, identical call setup signals 18–36 are utilized in FIG. 2 as was described with respect to FIG. 1. The only difference being that for each signal as shown in FIG. 1, two signals exist in FIG. 2 since one of the signals is in the respective leaf's native signaling protocol while the other signal is in the networks internal network signaling protocol. As an example to illustrate, the process begins by leaf 12 sending setup signal 18 to CPE 50 whereby CPE 50 responds with setup signal 18' that is in the internal network signaling protocol for network 16. Accordingly, for the one setup signal as shown in FIG. 1, two corresponding setup signals are show in FIG. 2 since one is in a native signaling protocol format and the other one being in the internal signaling protocol for network 16.

As discussed above, a disadvantage of this emulation technique is that stringent design parameters must be set when constructing the internal signaling protocol since there must exist an analogous message within the internal signaling protocol corresponding to one from every different native signaling protocol that the communication system may receive. Further, once the signal path is created, the signals must still be processed by network 16.

Figure 3:
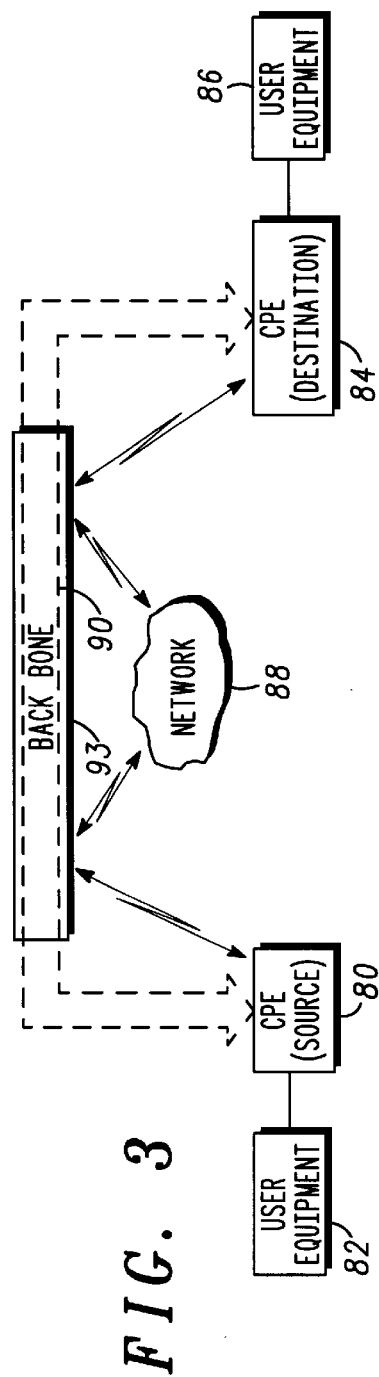
FIG. 3 is block diagram illustrating a method of communicating signaling messages through a broadband network in accordance with the present invention.

Referring now to FIG. 3, a block diagram illustrating a method of communicating signaling messages through a network in accordance with the present invention is shown. As discussed in more detail below, an advantage of the present invention is that not only is internal messaging reduced down to one simple message set, but also the signaling traffic through the network is substantially decreased and only exists during the setup of a signal path.

Accordingly, an aspect of the present invention is the bypassing of as much user signaling data as possible from the network once a signal path is established whereby the network is only used to setup a call and establish a signal path such that once such call is setup and such data path is established, the network is no longer needed and each CPE may talk directly to each other without burdening the network.

FIG. 3 shows source CPE 80 coupled to corresponding user equipment 82 whereby the user of equipment 82 desires to communicate with a destination user associated with CPE 84 and user equipment 86. CPE 80 initiates a call setup by requesting the system to perform a call setup process and create a signal path between source CPE 80 and destination CPE 84. In a preferred embodiment, this request is sent through backbone 93 of the communications system. Backbone 93 may take the form of either of terrestrial system or satellite system. Further, as described below, backbone 93 may be the "fiber in the sky" comprised of a constellation of low earth orbit (LEO) satellites associated with the Celestri™ satellite communications system. Alternately, backbone 93 may be comprised of the satellite constellation associated with the Teledesic system. In an alternate embodiment, CPE 80 may send the request directly to network 88 without first being processed by backbone 93, if such path exists or is allowed.

Backbone 93 then communicates with network 88 and network 88 then establishes communication with destination CPE 84 and begins the call setup process. Further, network 88 establishes signal path 90 via backbone 93 by which data may flow directly from CPE 80 to CPE 84. Once this signal path is established, the intervention by network 88 is no longer needed and is free to perform other call setups or other desired network functions. In a preferred embodiment, signal path 90 is a suitable path comprised of selected satellites of the Celestri™ system.

In more detail, user equipment 82 sends a request to CPE 80 in its native signaling protocol. CPE 80 suspends the message while a setup connection is being made with the destination side. CPE 80 then requests network 88 to setup a connection with destination CPE 84 by sending an internal setup message signal to network 88 via backbone 93. Network 88 then sets up the connection and establishes datapath 90 between CPE 80 and CPE 84. Once datapath 90 is setup, CPE 80 unsuspends the original message thereby allowing it to pass directly to CPE 84 via signal path 90 without interaction from network 88. Essentially, CPE's 80 and 84 are now communicating directly with each other and the data signals are not passing through network 88.

Figure 4:
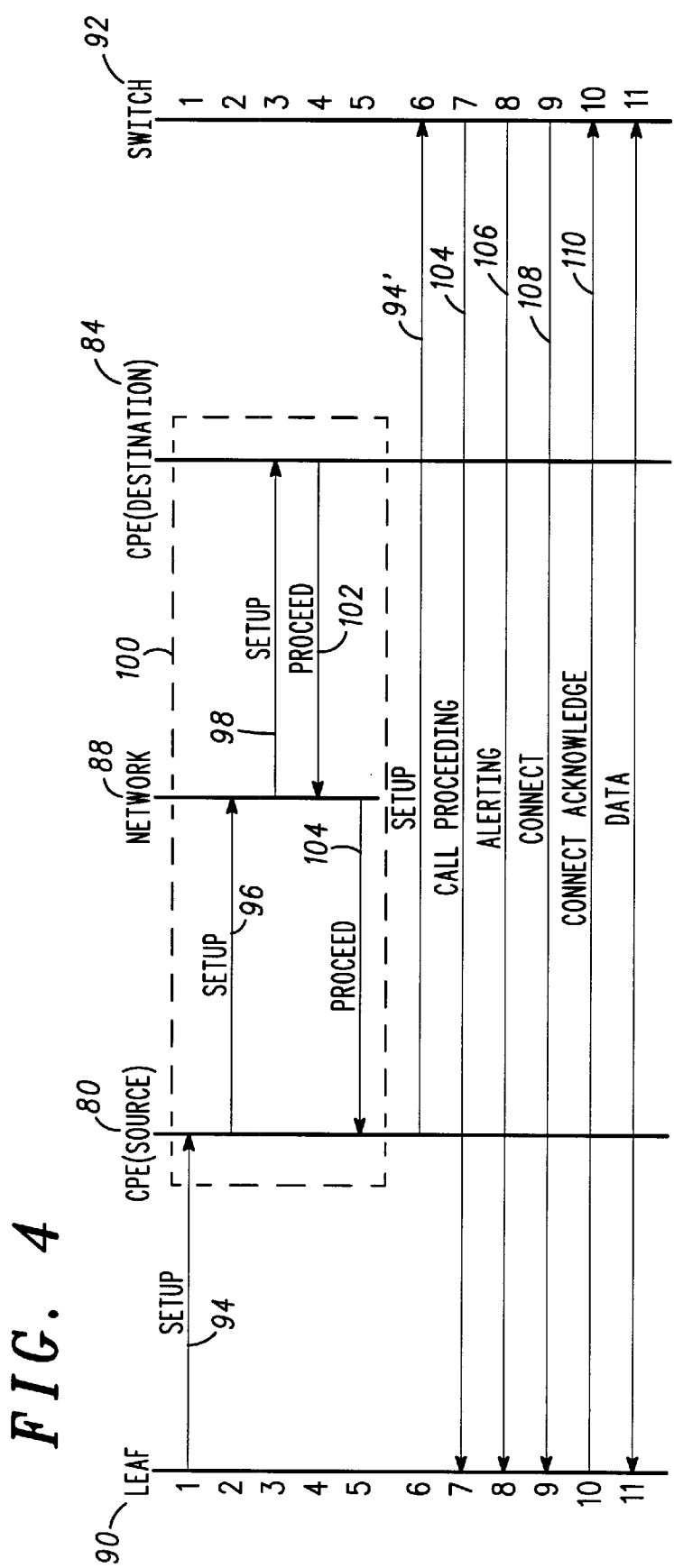
FIG. 4 is a pictorial diagram illustrating the setup and signaling path connections between a switch and a leaf in accordance with the present invention.
Figure 5:
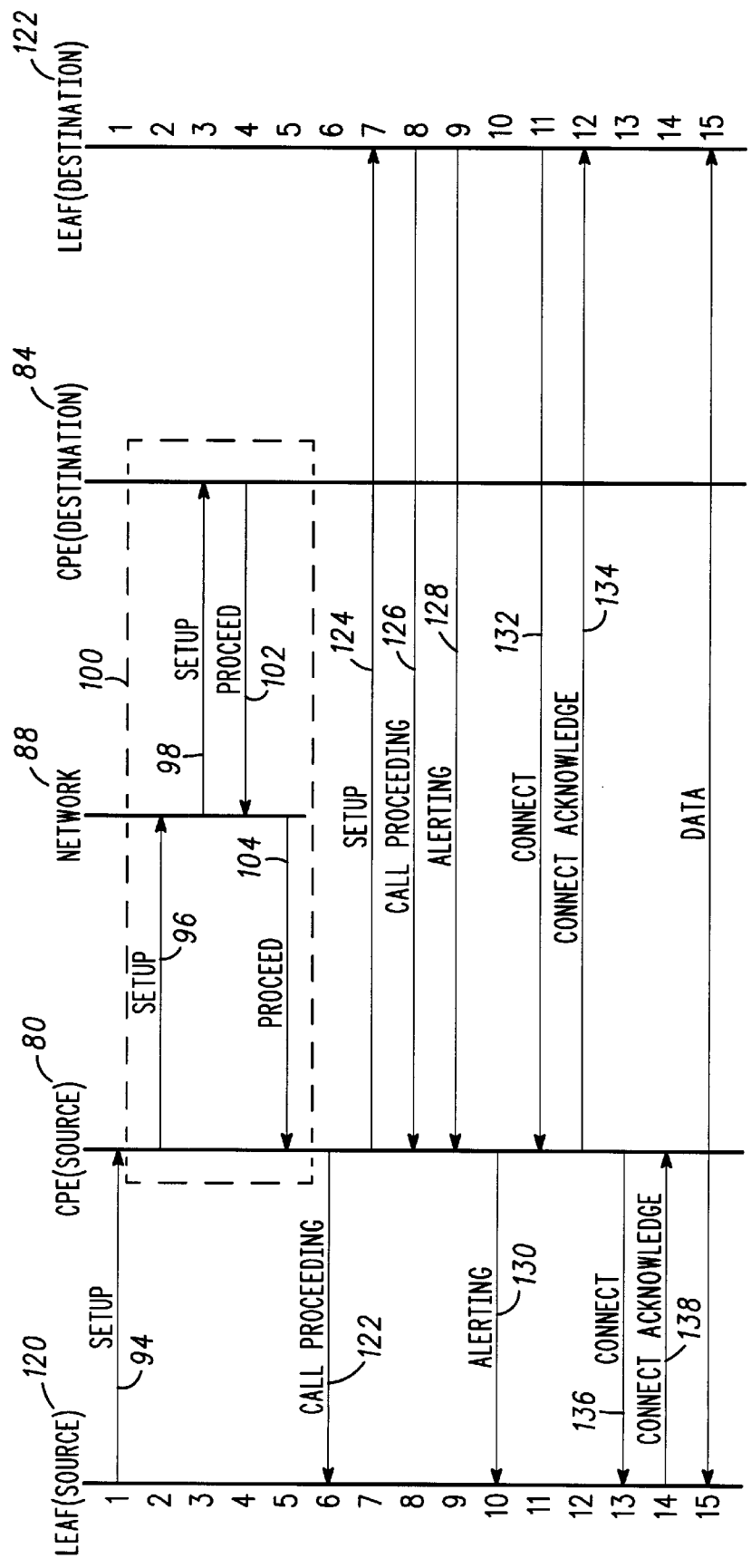
FIG. 5 is a pictorial diagram illustrating the setup and signaling path connections between a leaf-to-leaf connection in accordance with the present invention.

FIGS. 4 and 5 will now illustrate the steps associated with the call setup and establishment of signal path 90. Referring to FIG. 4, a pictorial diagram illustrating the setup and signal path connection between a switch and a leaf in accordance with the present invention is shown. FIG. 4 illustrates the steps performed by network 88 in order to setup a connection between CPE 80 and CPE 84 when the connection is between a switch and leaf, as opposed to a leaf-to-leaf connection, which will be described with reference to FIG. 5.

The first sequence of events illustrated in FIG. 4 is that leaf 90, which desires to communicate with switch 92 at the destination side, sends setup message 94, in its native signaling protocol language, to source CPE 80. As discussed earlier, CPE 80 suspends this signal and sends a request to network 88 for a call setup and establishment of a signal path.

The next four sequence of events, as illustrated in box 100, is where the data/signal path between source CPE 80 and destination CPE 84 is established. Further, these signals in box 100 are in an internal signaling protocol associated with network 88. In particular, box 100 illustrates that CPE 80 sends setup signal 96 to network 88 whereby network 88 provides notification of setup signal 96 to destination CPE 98 by supplying a setup signal 98 to destination CPE 84. Destination CPE 84 responds that the setup is proceeding with proceed signal 102 whereby network 88 provides notification of proceed signal 102 to source CPE 80 by supplying a corresponding proceed signal 104 back to source CPE 80. At this point, network 88 has established signal path 90 between CPE 80 and CPE 84 and setup signal 94, which was originally suspended by CPE 80, is allowed to pass through CPE 84 to switch 92, via setup signal 94'. Although setup signal 94' passes through destination CPE 81, no processing of the signal is being performed by CPE 84 and at this point, as discussed above, network 88 is not being utilized. Accordingly, once network 88 has setup the data path between CPE 80 and CPE 84, it is no longer needed thereby substantially decreasing the burden on network 88 associated with the transfer of data between leaf 90 and switch 92.

Continuing on to complete the call setup, switch 92 responds back to leaf 90 with call proceeding signal 104 and alerting signal 106. Once a connection is made, switch 92 responds with connect signal 108 to leaf 90 whereby leaf 90 responds appropriately with a connect acknowledge signal 110 back to switch 92.

At this point, data flows directly between leaf 90 and switch 92 via datapath 90 as setup by network 88 during the steps performed in block 100. Accordingly, leaf 90 and switch 92 may communicate with one another without interaction from network 88.

Although FIG. 4 illustrates steps 94–110 as being performed in a certain order, it is understood that the order of steps 94–110 may be interchanged or deleted. For example, the alerting, call proceeding and/or connect acknowledgment signals are optional.

Referring to FIG. 5, a pictorial diagram illustrating the setup and signaling path connections between a leaf-to-leaf connection in accordance with the present invention is shown. FIG. 5 illustrates a special case where communication is desired between a leaf-to-leaf, whereby one of the CPE's, either the source or the destination, is required to emulate a switching function because, in general, a message dialog must occur between the leafs and a signaling network function in order to setup a connection. However, since leafs are essentially dumb terminals and do not include any intelligence for setting up such connection, one of the CPE's must take on the role of emulating a switch so that a proper connection may be established. Leaf terminals may be, for example, telephones, modems, faxes, point of sale terminals, cash registers, networking cards in a computer or other networked appliances. On the contrary, switches are characterized as having some intelligence and being capable of setting up a connection. Switches may be, for example, core switches, edge switches or routers.

The first sequence of events illustrated in FIG. 5 is that source leaf 120, which desires to communicate with destination leaf 122, sends a setup signal 94 to source CPE 80. CPE 80 suspends this signal and sends a request to network 88 for a call setup and establishment of a signal path. As described with respect to FIG. 4, the signal path between CPE 80 and CPE 84 is setup by the steps performed in block 100.

In FIG. 5, source CPE 80 is chosen to emulate the functions typically performed by a switch. However, as mentioned above, the choice is arbitrary and destination CPE 84 could have been chosen as well. Accordingly, since CPE 80 is performing the emulation of the switch, CPE 80 supplies call proceeding signal 122 to leaf 120. CPE 80 then sends setup message 124 to leaf 122 and leaf 122 appropriately responds back to CPE 80 with call proceeding signal 126 and alerting signal 128. CPE 80 reflects alerting signal 128 back to leaf 120 via alerting signal 130.

When leaf 122 is connected, it appropriately responds with connect signal 132 and CPE appropriately reflects back a connect acknowledgment signal 134. CPE alerts leaf 120 that leaf 122 is connected by sending connect signal 136 to leaf 120 whereby leaf 120 appropriately responds with connect acknowledge signal 138.

At this point, leaf 120 is now properly connected to leaf 122 and data now flows directly from leaf 120 to leaf 122 through the signal path 90. Although the data flows through CPE 80 and CPE 84, the CPE's perform no processing. Further, no data flows through network 88 thereby substantially decreasing the burden on the network.

Similar to FIG. 4, although FIG. 5 illustrates steps 122–138 as being performed in a certain order, it is understood that the order of steps 122–138 may be interchanged or deleted.

The present invention is applicable to just about any terrestrial communication system as well as any satellite communication system. That is, any communication system can enjoy the advantage of the present invention since removing the signaling burden from the network is a substantial advantage to any system.

Figure 6:
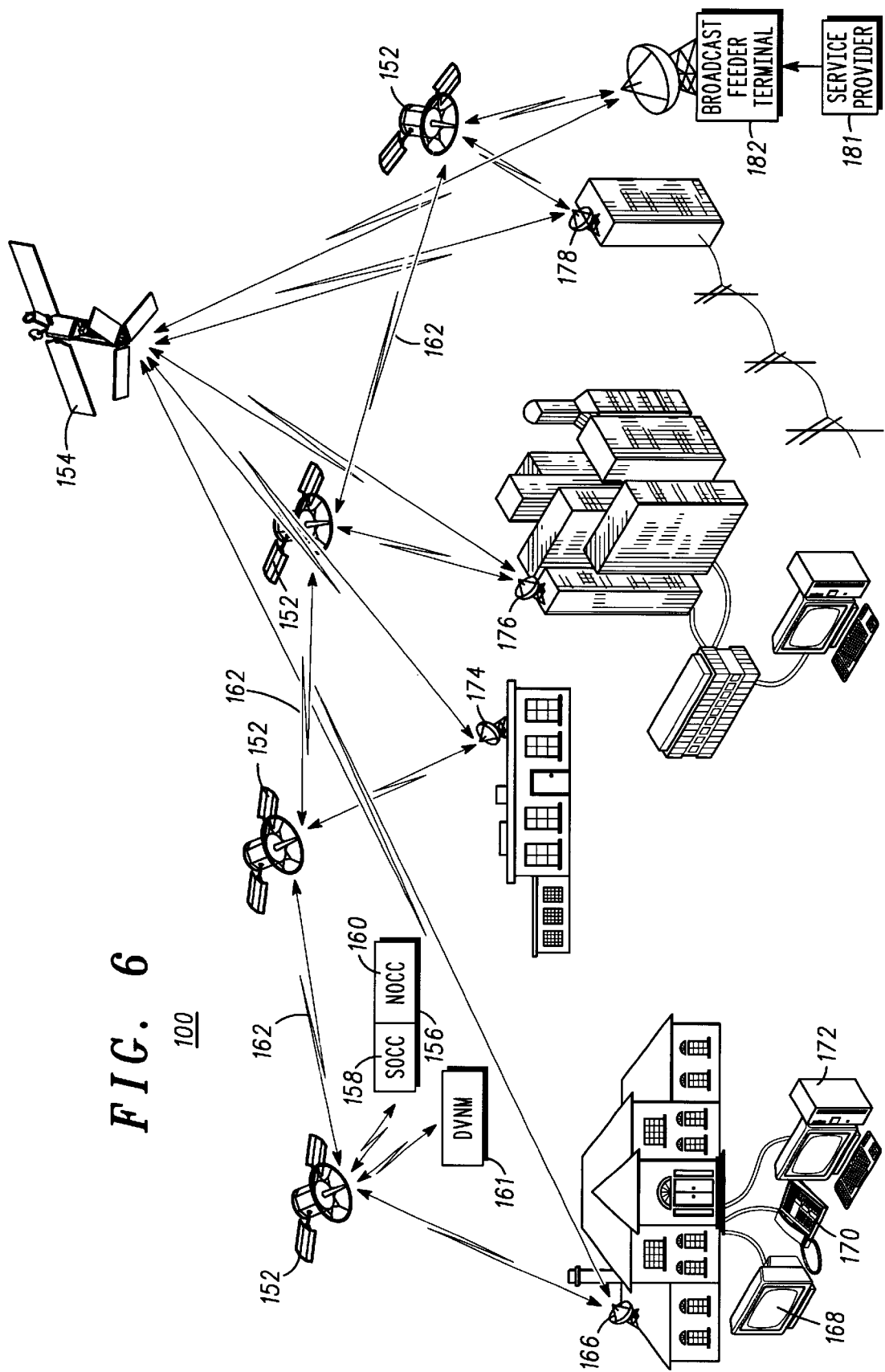
FIG. 6 is a block diagram illustrating an architecture of a satellite communications system of which may utilize the present invention.

Referring now to FIG. 6, an architectural block diagram of the Celestri™ satellite communication system of which may utilize the present invention, is shown. System 100 includes a constellation of low-earth orbit (LEO) satellites 152, one or more mission operations control centers (MOCC) 156 which includes a satellite operations control center (SOCC) 158 and a network operation control center (NOCC) 160, one or more distributors virtual network managers (DVNM) 161, and at one least one customer. premises equipment (CPE) as represented by home terminal 166, small business terminal 174, corporate terminal 176, gateway terminal 178 and broadcast feeder terminal 182.

Additionally, system 100 includes one or more GEO stationary earth orbit (GEO) satellites that may be utilized for broadcast of high bandwidth data, whereby typically the LEO satellites provide interactive services to the CPE's since LEO satellites enable much smaller transit delays as compared to GEO satellites.

In the Celestri™ system, 63 LEO satellites are envisioned and will orbit the earth at approximately 800 miles above the surface of the earth, whereby up to 9 GEO satellites are envisioned and will orbit the earth at approximately 23,000 miles above the surface of the earth. Accordingly, the LEO satellites are typically used for interactive data that is sensitive to delay whereby the GEO satellites are typically used for the transmission of information that is not sensitive to delay and also for the broadcast of high bandwidth data. Note, however, that although that is what the satellites are typically used for, it is understood that the LEO satellites could also be used for the transmission of high bandwidth broadcast data, whereby GEO satellites could also be used for transmission and broadcast of interactive data if such delay is acceptable.

In a preferred embodiment, satellites 152 are interconnected via optical inter-satellite links (ISL's) 162 to provide a global communication network infrastructure. In alternate embodiments, different types of links such as RF links may be used.

The satellite operations control center (SOCC) 158 typically includes the processing equipment, operator stations, software and other facilities used in the launching, control, maintenance, and decommissioning of the satellites in the constellations. Satellite operations processing and communications with the constellation are accomplished from two satellite operation control centers and local and remote antenna facilities using communication channels and the inner satellite network for continuous access to any satellite in the constellation. Further, the SOCC controls the flight orbit of the satellites within the system whereby it receives various telemetry data regarding the satellites describing, for example, its altitude, its speed, and whether it is in the correct orbital position. The SOCC also has the ability to fire the satellites' jets in order to control its orbit. The SOCC also has the ability to move the solar panels on the satellites as well as recharge its batteries.

Network operations control center (NOCC) 160 includes the processing equipment, operators' stations, software and other facilities that perform the network management functions allocated to the system management domain. Generally, a NOCC is co-located with a SOCC and shares the communications resources and other support facilities within a MOCC. The routing information included in a look-up table is desirably updated multiple times a minute to account for the motion of the LEO satellites. This information for the table updates is predetermined by a routing management function in the NOCC and block uploaded to the satellites.

Distributor virtual network manager (DVNM) 161 controls the service and subscriber management for the system for each individual service provider. The Celestri™ system is fully operational with one DVNM, but it is anticipated that a number of service providers will sell access to the system and each of these providers will have at least one of their own DVNM.

Block diagrams of the NOCC and DVNM are shown in pending application having Ser. No. 08/873,877, filing date of Jun. 12, 1997, entitled "GLOBAL TELECOMMUNICATIONS SYSTEM WITH DISTRIBUTED VIRTUAL NETWORKS AND METHOD OF OPERATION THEREFOR", and attorney docket number IR03745, the subject matter of which is hereby incorporated by reference herein.

Each CPE unit 166, 174, 176, and 178 have the capability to transmit and receive data to and from LEO satellites 152 and to receive broadcast data from GEO satellites 154. Further, terminal 182 is capable of transmitting data from the ground up to the GEO for re-broadcast to the other CPE units 166, 174, 176 and 178. The CPEs provide the subscriber interfaces to the Celestri™ system and also support a variety of network management functions for the associated DVNM. In the Celestri™ System, four CPE terminals are envisioned: (1) gateway terminal 178, (2) corporate terminal 176, (3) small business terminal 174, and (4) direct-to-home terminal 166. Gateway terminal 178 provides an interface to a public switching telephone network (PSTN) or other public networks at data rates up to 155 million bits per seconds (Mbps). Corporate terminal 176 provides access for enterprise networking and provisioned private lines at data rates up to 51 Mbps. Small business terminal 174 is a VSAT class terminal designed to provide a variety of services for small businesses at a receive data rate of up to 16 Mbps and at a transmit data rate of up to 10 Mbps. Direct-to-home terminal 166 is a small satellite terminal designed to provide multi-media and telecommuting services to the home at a receive data rate of up to 64 Kbps-16 Mbps and at a transmit data rate of up to 64 Kbps-2 Mbps. Home terminal 166 may be coupled to, for example, TV 168, phone 170, and computer 172.

Additionally, system 100 includes a fifth type of CPE terminal as represented by broadcast feeder terminal 182 which is coupled to service provider 181. Terminal 182 is capable of uploading data to GEO satellites 154 at data rates up to 51 Mbps. Service provider 181 may also receive data from GEO satellites 154 at a rate of 20 Mbps, for example, for monitoring purposes, for example. Terminal 182 may also receive and transmit data to LEO satellites 154 if necessary. For example, terminal 182 may communicate with the LEO satellites for acknowledging, adding or deleting various user broadcast services whereby users of the system would uplink to the GEO services via the LEO satellites.

Figure 7:
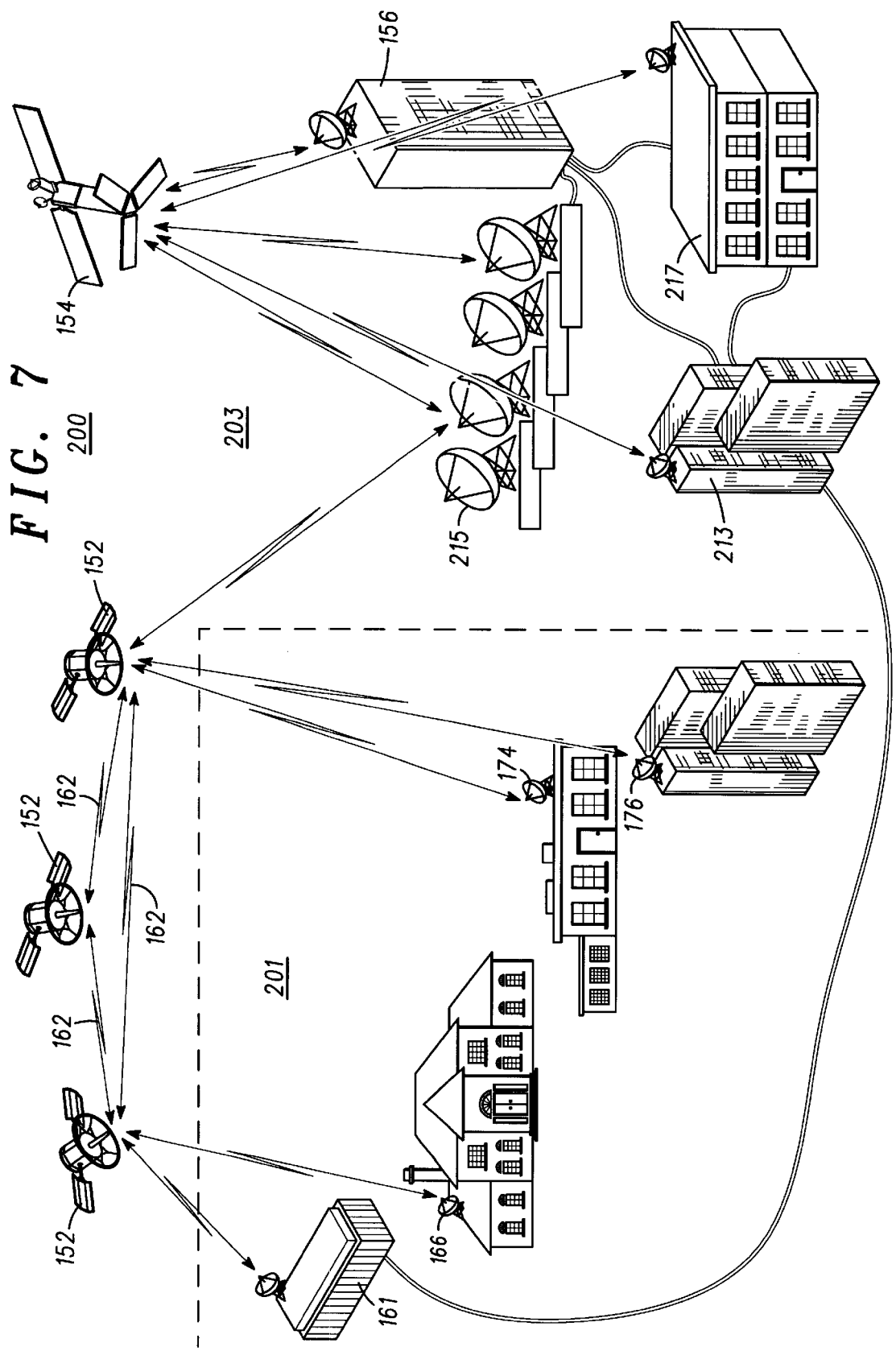
FIG. 7 is a block diagram illustrating a conceptual diagram of the satellite communications system of FIG. 6.

Referring now to FIG. 7, a conceptual network architecture 200 for the Celestri™ satellite communications system is shown. Components shown in FIG. 7 that are identical to components shown in FIG. 6 are identified by the same reference numbers. The system includes local management domain 201 and system management domain 203 whereby a plurality of local management domains typically exist in the communications system.

System management domain 203 includes LEO satellites 152 and GEO satellites 154. LEO satellites 152 additionally include intersatellite links (ISL) 162 for transferring information between the various LEO satellites.

System Management Domain 203 includes a primary MOCC 156 and a backup MOCC 213 whereby each MOCC includes a SOCC and NOCC as described above. The SOCC and NOCC are coupled to remote antenna facilities 215 for the transmission and reception of signals to and from LEO satellites 152 and GEO satellite 154. Further, MOCCs 156 and 213 are coupled to system domain business management center 217 whereby center 217 provides subscription services to add new local domain distributor 203 calculations, billing data for each distributor 203, and a clearing house for billing transactions between the DVNM's.

Local management domain 201 includes a plurality of CPE units such as CPEs 166, 174 and 176 (as well as CPEs 178 and 182 that are not shown in FIG. 7), as described with respect to FIG. 5, as well as DVNM 161.

In addition to the functions described with respect to FIG. 6, the NOCC is responsible for managing the physical configuration of the network with the exception of the management of the subscriber CPE's, which is managed by the DVNM's. However, the NOCC manages the DVNM's and wholesales bandwidth to the DVNM's as well as monitors performance of the system and handles various faults within the system, for example, if one or more of the satellites are not operating properly, the NOCC will respond and re-route various satellite paths within the constellation.

Figure 8:
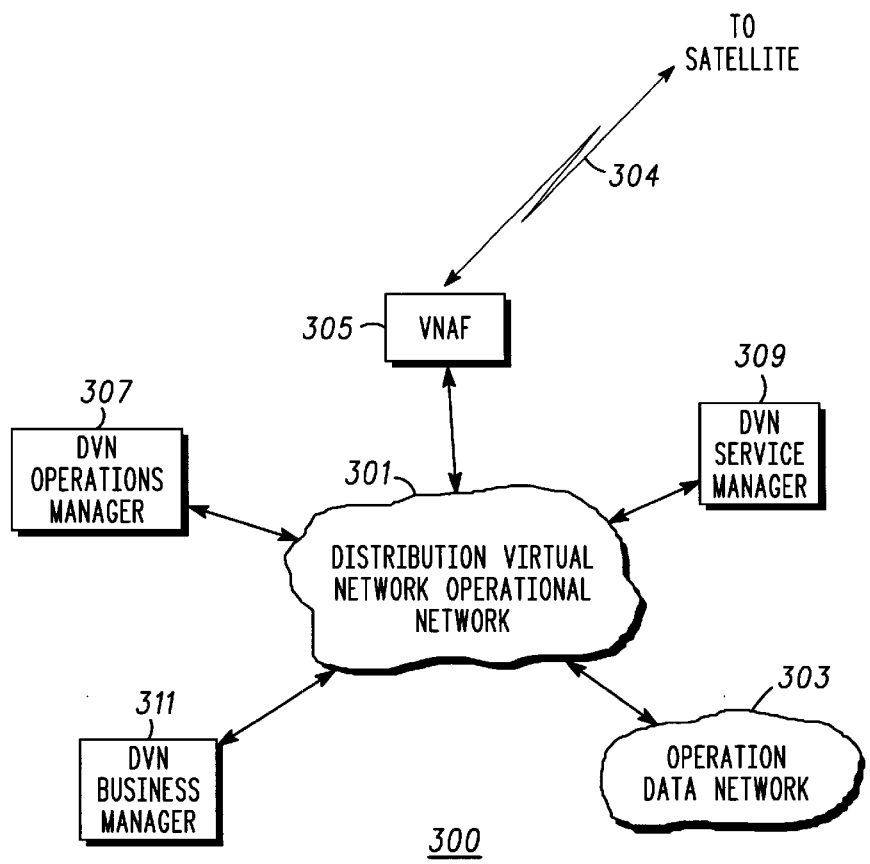
FIG. 8 is a block diagram illustrating, in more detail, the distributors virtual network manager (DVNM) of FIG. 6.

Referring now to FIG. 8, a high-level block diagram of a distributors virtual network manager 300 is shown. DVNM 300 includes a local area network, or other distribution network, at the local site of the DVNM as depicted by distributor virtual network operational network 301. Block 303 is the operational data network which is typically a terrestrial network which ties in all the DVNM's as well as the NOCC and SOCC within the Celestri™ system. Network 303 is primarily useful when the Celestri™ system is first brought into functionality whereby network 303 provides a terrestrial network that is capable of providing end-to-end signal closure when there are less than a full constellation of satellites in orbit.

Virtual Network Antenna Facility (VNAF) 305 includes the antenna facility for the transmission and reception of signals 304 between the satellites and DVNM 300. It is understood that several VNAF 305's may be associated with each DVNM 300 to provide for geographical diversity such that each DVNM is not affected by rain/weather. For example, DVNM 300 may include at least two VNAF 305's separated by 30 to 50 miles.

DVN Operations Manager 307 is responsible for setting up and removing connections for various calls within the Celestri™ system. For example, when DVNM receives a request from a CPE to set up a connection, it is received via VNAF 305 and passes through network 301 whereby DVN Operations Manager 307 first translates the native address of the CPE desiring to be called into a Celestri™ system address. Manager 307 also verifies that the two CPE's desiring to communicate with one another are compatible. Also, Manager 307 then verifies whether the connection is authorized per the configuration, guidelines and/or rules associated with DVNM 300 and its corresponding DVNM, if not within DVNM 300. Finally, Manager 307 confirms that the requested bandwidth is available within the Celestri™ system.

DVN Service Manager 309 is responsible for various services or features that would ride on top of connections, for example, special calling features such as call waiting, call forwarding or three-way calling. Further, Manager 309 may also provide content, for example, by providing movies, database searches, or any other signals that may be on top of a connection.

DVN Business Manager 311 is responsible for collecting billing information based on (a) the connection that Manager 307 has set up and (b) the services that are delivered via Manager 309. Manager 311 also collects billing information from the NOCC for the wholesale bandwidth that it has been allocated. That is, Manager 311 essentially buys wholesale bandwidth from the Network Operations Control Center and is responsible for reallocating such bandwidth to the various CPE's based upon demand and keeping track of such billing information for the CPE's within its distributor network.

Figure 9:
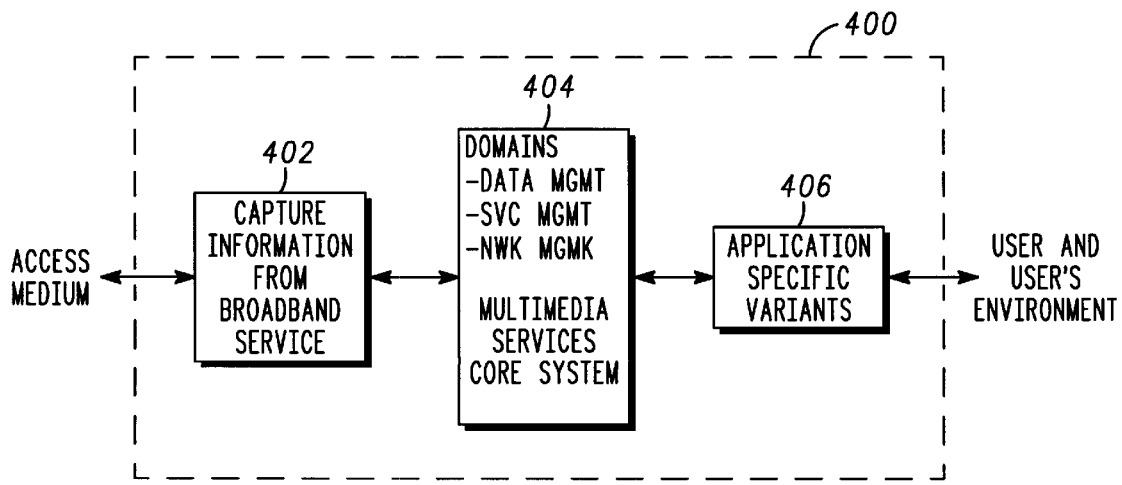
FIG. 9 is a block diagram illustrating, in more detail, an architecture of the customer premises equipment (CPE) of FIG. 6.

Referring to FIG. 9, a block diagram illustrating, in more detail, an architecture of the customer premises equipment (CPE) of FIG. 6, is shown. FIG. 9 represents the basic architecture applicable to all CPEs 166, 174, 176, 178 and 182 of FIG. 6. CPE Architecture 400 includes three functional blocks as identified by capture information from broadband service block 402, multi-media services core system block 404, and application-specific variants block 406. Each block includes both hardware and software for implementing its desired function.

Block 402 is coupled to an outside medium for transferring information between that medium and core system 404. With respect to the outside medium, block 402 includes the necessary hardware and software for interfacing to a plurality of different infrastructures corresponding to different systems. To that end, block 402 provides the connectivity to a plurality of system networks such as, for example, the Celestri™ Satellite Communications System, an ADSL network associated with a telephone company, a local multimedia distribution service (LMDS) associated with a terrestrial communications system, a cable line associated with a cable company, the Teledesic System, and satellite TV systems such as Direct TV. The purpose of block 402 is that whatever information is particular to information of a particular system's infrastructure, block 402 functions to capture such information from its corresponding service provider. Additionally, block 402 functions to isolate the physical transport medium from the rest of the components within CPE architecture 400. To that end, the output of block 402 includes data that typically is at base band, or at some IF, and such data is compatible with core system 404. Accordingly, core system 404 is not concerned about where the data came from or is going to, that is the function of block 402. Rather, core system 404 merely performs the necessary processing on data via a predetermined interface between blocks 402 and 404. The format of this baseband data transferred to core system 404 may take of an electrical bus/serial bus type of interface, for example, PCI bus, NU bus, or even DS3/T3 or OC-3 SONET format.

Multi-media services core system 404 operates in a multimedia system for transferring data to and from block 402 to provide management of data flowing through core system 404. Core system 404 also provides service management such as establishing connections and tearing down connections and verifying and confirming addresses, for example. Further, core system 404 provides various network management functions such as network configuration, detecting and reporting various faults and counting bits flowing through core system 404 for the purposes of accounting and billing, for example. That is, core system 404 handles the multimedia functions and operations that are common for data associated with the different infrastructures coupled to block 402 regardless of the particular business structure that the network provider is using.

Some of the services that may be provided by core system 404 include, but are not limited to, encryption, connectivity, information transportation, authentication, minimum delay service delivery, precedence/priority, call intercepting, multicasting, customer service, statistical data collection and reporting, and delayed service delivery.

Multimedia services core system 404 also has the capability through its management functions to provide a plurality of features. Such features include, but are not limited to, security, accounting, extensibility, scalability, nomadicity and interactivity. In more detail, security is a feature that may be provided for providing both privacy and user authentication. These security features may be a set of tools that are provided to the application-specific variants block 406 so that they may be able to enjoy the privacy and authentication capabilities that are built into core system 404.

The feature of accounting may be provided. for tracking various services that a service provider may want to bill for. For example, the accounting function may be counting bits moved, packets moved, cells moved, or consumption of a particular large block of data such as a movie. Note, that by utilizing the features of security and accounting, the present CPE architecture has the capability to provide secure billing to a user for a plurality of services that is being received by CPE architecture 400. Additionally, the feature of accounting may be used for metering and merging other services delivered or consumed in the home such as water, power, gas, or the like.

The feature of extensibility may be provided whereby it is envisioned that each of the functions is expected to have an application programming interface (API) associated therewith so as to allow different combinations of the basic features to be used by service-programmers such as by the Celestri™ system manufacturer, or other third-party software developers. This will be described in more detail with respect to the open interface architecture and block 406.

The feature of scalability refers to the ability to use CPE architecture 400 for a variety of different classes of CPE's such as those for the home use versus those for small businesses and large corporations. This basic architecture is scaleable for a plurality of different CPE embodiments whereby each embodiment is targeted for a particular type of user.

The feature of nomadicity refers to the feature of allowing users to have access to their subscribed services regardless of which CPE terminal they may be accessing at any particular time. Such a feature would envision the capability to identify the user desiring to access the CPE along with information describing which features/services that the user is authorized to access.

The feature of interactivity refers to the capability of providing data in both directions. That is, although it was earlier described that broadband service block 402 provided data to core system 404, it is understood that core system 404 also supplies data to broadband service block 402. Further, data coming from the user's environment may be sent through application-specific variants block 406 to be processed by core system 404, and vice versa. CPE architecture 400 provides for a fully bi-directional terminal.

The output of core system 404 is coupled to application-specific variants block 406 whereby the interface between blocks 404 and 406 is envisioned to be an open interface architecture. That is, the definition of how core system 404 communicates with application-specific variants 406 will be made available to the public. Examples of interfaces that may be used between blocks 404 and 406 include Windows™ interface, Macintosh Toolbox™ interface or UNIX drivers. Accordingly, this would allow many different vendors to create various application-specific variants that would communicate with core system 404 by providing the necessary interface between core system 404 and various user equipment. Application-specific variants 406 may take the form, for example, of various software for providing the necessary interface between core system 404 and user equipment capatible with ethernet, PCMCIA, ATM, CE bus and X10 standards, for example. This open interface will have the capabilities of being (1) high speed, (2) standard and desirable by many users, (3) able to support multiple streams of data so as to allow core system 404 to provide necessary data to a plurality of users within the users' environments and (4) personal so as to allow for various personal features for each user.

As an example, suppose that a user desires to implement a video conferencing system utilizing the CPE architecture 400. Such user would need to acquire a specific video card, i.e., an application specific variant, that would operate with their selected video equipment and that would interface with core system 404 via the open interface architecture. Such a video card would typically include hardware components as well as software drivers. This would allow the user to utilize CPE 400 to set up a video conferencing call whereby the video card would take the form of the application-specific variant of box 406, box 404 would perform the necessary processing and data and service and network management, and such information would then be sent out over a selected infrastructure medium, such as the Celestri™ system, via broadband service block 402. Further, this video information could then be received by another user and possibly one utilizing even a different infrastructure than the Celestri™ system provided that that user has the necessary application-specific variant card for such video conferencing.

Referring back to FIG. 3 in the context of the Celestri™ system, CPEs 80 and 84 takes the form of any combination of CPEs 166, 174, 176 or 178, backbone 93 takes the form of LEO satellites 152 with its ISLs 162, and network 88 takes the form of DVNM 161 and more specifically, DVN operations manager 307. Accordingly, the Celestri™ system may utilize the present invention in that a source CPE requests DVN operations manager 307, via LEO satellites 152, to setup and establish a signal path to a desired destination CPE. Once DVN operations manager 307 establishes signal path 90 by selecting appropriate LEO satellites 152 to enable the passage information between the source and destination CPEs, DVN operations manager 307 is no longer necessary for such passage of information and the DVN operations manager 307 is free to perform other manager functions, as mentioned herein. In this manner, the NOCC has created a "direct" path between the two CPEs, "direct" in the sense that no NOCC intervention or processing is necessary.

What is claimed is:

1. A method for communicating between a first user and a second user of a satellite communications system of the type which includes a network for establishing communications paths between users and a backbone having at least one satellite, comprising:

the first user initiating a data transfer to a second user by issuing a call setup request to a first CPE connected to the first user and to the network, utilizing the network to complete the call setup between the first CPE and a second CPE connected to the network and to the second user, and to establish a data path between the first user and the second user over the backbone, upon completion of the call setup, transmitting data between the first user and the second user over the backbone without further intervention by the network.

2. A method as set forth in claim 1 wherein the setup request is conveyed to the network via the backbone.

3. A method as set forth in claim 1 wherein the setup request is conveyed directly to the network independent of the backbone.

4. A method for establishing a data path between a first user and a second user of a satellite communications system of the type which includes a network for establishing communications paths between users and a backbone having at least one satellite, comprising:

the first user initiating a data transfer to a second user by issuing a call setup request to a first CPE connected to the first user and to the network, utilizing the network to initiate a preliminary call setup between the first CPE and a second CPE connected to the network and to the second user, utilizing the network to complete the preliminary call setup between the first CPE and the second CPE, and to establish a data path between the first user and the second user over the backbone, and, upon completion of the preliminary call setup, concluding the call setup directly between the first user and the second user and transmitting data between the first user and the second user over the backbone without further intervention by the network.

5. A method as set forth in claim 4 wherein the setup request is conveyed to the network via the backbone.

6. A method as set forth in claim 4 wherein the setup request is conveyed directly to the network independent of the backbone.

7. A method as set forth in claim 4 wherein the first CPE suspends the transfer of data until the data path is established between the first user and the second user.

* * * * *